(12) United States Patent
Taylor-Smith

(10) Patent No.: US 6,184,968 B1
(45) Date of Patent: Feb. 6, 2001

(54) FLAT PANEL DISPLAYS AND METHODS AND SUBSTRATES THEREFOR

(75) Inventor: Ralph E. Taylor-Smith, Dunnellen, NJ (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 08/844,017

(22) Filed: Apr. 18, 1997

Related U.S. Application Data

(62) Division of application No. 08/641,856, filed on May 2, 1996, now Pat. No. 5,739,180.

(51) Int. Cl.⁷ .......................... G02F 1/1333; C08F 83/00
(52) U.S. Cl. ........................................... 349/158; 523/203
(58) Field of Search ................................ 349/158, 159, 349/160; 523/203, 216

(56) References Cited

U.S. PATENT DOCUMENTS

| | | | |
|---|---|---|---|
| 5,360,834 | * 11/1994 | Popall et al. | 522/36 |
| 5,492,996 | * 2/1996 | Dang et al. | 528/171 |
| 5,508,376 | * 4/1996 | Dang et al. | 528/328 |
| 5,514,734 | * 5/1996 | Maxfield et al. | 523/204 |
| 5,558,908 | * 9/1996 | Lukacs, III et al. | 427/228 |
| 5,739,180 | * 4/1998 | Taylor-Smith | 523/203 |
| 5,757,445 | * 5/1998 | Vu et al. | 349/158 |

OTHER PUBLICATIONS

Im et al., "Materials for Flat-Panel Displays," Mat. Res. Soc'y. Bull., v. 21(3), p. 27, Mar. 1996.

Moffatt, D.M., "Glass Substrates for Flat Panel Displays," Mat. Res. Soc'y. Bull., v. 21(3), pp. 31–34, Mar. 1996.

Hanna et al., "Materials in Active–Matrix Liquid–Crystal Displays," Mat. Res. Soc'y. Bull., v. 21(3), pp. 35–38, Mar. 1996.

Rack et al., "Materials Used in Electroluminescent Displays," Mat. Res. Soc'y. Bull., v. 21(3), pp. 49–58, Mar. 1996.

Weber et al., "Materials and Manufacturing Issues for Color Plasma Displays," Mat. Res. Soc'y. Bull., v. 21(3), pp. 65–68, Mar. 1996.

Arkles, B. (ed.) Gelest Catalog for Silicon, Germanium, Tin and Lead Compounds, Metal Alkoxides, Diketonates and Carboxylates, pp. 280–283, (Gelest Inc. 1995).

O'Mara, W.C., *Liquid Crystal Flat Panel Displays: Manufacturing Science & Technology*, pp. 57–97 (Van Nostrand Reinhold, 1993).

(List continued on next page.)

*Primary Examiner*—William L. Sikes
*Assistant Examiner*—Dung Nguyen
(74) *Attorney, Agent, or Firm*—DeMont & Breyer; Wayne S. Breyer; Jason Paul DeMont

(57) ABSTRACT

Flat-panel displays, a substrate for use in such displays, and methods for making the displays and the substrate are disclosed. The substrate is a hybrid composite containing an organic component and an inorganic component. The substrate possesses attributes of the organic component, which is typically a plastic, such as light weight and impact resistance, as well as attributes of the inorganic component, typically silica particles, such as high temperature stability. A variety of flat-panel displays can be made by depositing appropriate device layers, using standard fabrication procedures, on the hybrid composite substrate. The monomer is selected, and the relative concentrations of the organic to the inorganic component in the composite are established, based on the thermal processing requirements for making the type of display for which the substrate is intended.

15 Claims, 8 Drawing Sheets

OTHER PUBLICATIONS

Yoshida, A., "Silica Nucleation, Polymerization, and Growth Preparation of Monodispersed Sols," in *The Colloidal Chemistry of Silica*, Bergna, H.E. (ed.), Adv. Chem. Ser. 234, ACS, Washington, D.C. (1990).

Mennig et al., "Sol–Gel Derived Thick Coatings and Their Thermomechanical and Optical Properties," SPIE, vol. 1758, Sol–Gel Optics II, pp. 125–134, (1992).

Ellsworth, M.W. and Novak, B.M., "Mutually Interpenetrating Inorganaic–Organic Networks: New Routes into Non-shrinking Sol–Gel Composite Materials," J. Am. Chem. Soc., v. 113, pp. 2756–2758, (1991).

Novak, B.M. et al., "Simultaneous Interpenetrating Networks of Inorganic Glasses and Organic Polymers: New Routes into Nonshrinking Sol–Gel Derived Composites," Polym. Prep., v. 31, pp. 698–699, (1990).

Brinker, C.J. and Scherer, G.W., *Sol–Gel Science: The Physics and Chemistry of Sol–Gel Processing*, p. 115, (Academic Press, CA 1990).

Philipp, G. and Schmidt, H., "New Materials For Contact Lenses Prepared From Si–and Ti–Alkoxides by the Sol–Gel Process," J. Non–Crystalline Solids, v. 63, pp. 283–292, (1984).

\* cited by examiner

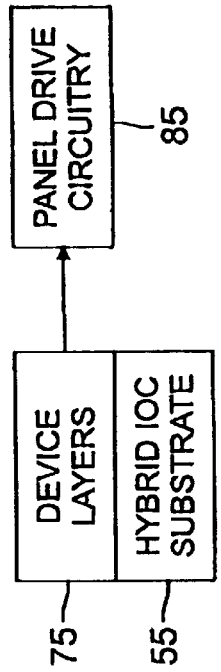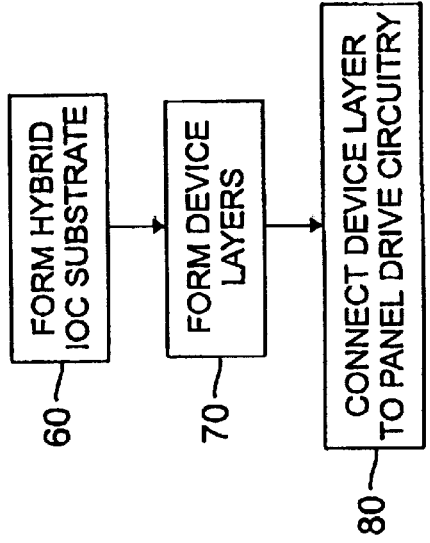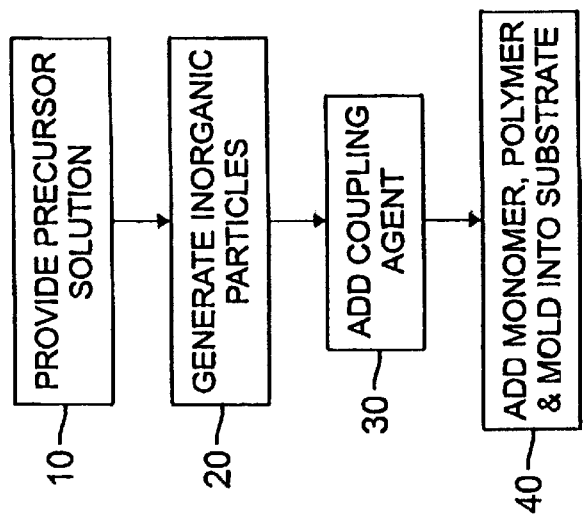

FLAT PANEL DISPLAYS AND METHODS AND SUBSTRATES THEREFOR

This is a divisional of copending application Ser. No. 08/641,856 filed on May 2, 1996 now U.S. Pat No. 5,739,180.

FIELD OF THE INVENTION

The present invention relates to methods and apparatus for improved flat-panel displays, and more particularly to improved substrates for use in such displays.

BACKGROUND OF THE INVENTION

Glass is used in a wide range of electronic applications because it possesses a number of desirable properties, including transparency and high thermal stability.

An example of an electronics product utilizing glass is a flat-panel display (FPD). FPDs are becoming ubiquitous; they are in homes, in the workplace and most other places, as well. And their use is increasing. See, for example, a series of articles concerning flat panel displays appearing in the Materials Research Society Bulletin for March 1996; Im et al., "Materials for Flat-Panel Displays," p. 27; Moffatt, "Glass Substrates for Flat Panel Displays," pp. 31–34; Hanna et al., "Materials in Active-Matrix Liquid-Crystal Displays," pp. 35–38; Rack et al., "Materials Used in Electroluminescent Displays," pp. 49–58; and Weber et al., "Materials and Manufacturing Issues for Color Plasma Displays," pp. 65–68. These articles are incorporated by reference herein.

One example of a FPD is an active-matrix liquid crystal display (AMLCD). Such displays are expected to soon become the dominant technology for high resolution, dense information-content visual communication systems. Lightweight, rugged, impact-resistant, high resolution AMLCDs for portable systems such as pagers, phones, personal digital assistants and the like are desired. Minimizing the weight of such displays will relax power dissipation requirements since the weight credit can be applied to additional battery capacity. Ruggedness and impact resistance are especially desirable in portable products due to handling considerations.

Glass, which is presently used for most FPD applications, is a relatively high weight, low impact resistance and high cost material. It would be desirable, therefore, to find a low cost, rugged and light weight alternative to glass for use in AMLCDs and other FPDs. Conventional plastics possess the aforementioned properties and can be used to replace glass in a few FPD applications, e.g., passive LCDs. Conventional plastics are not, however, suitable for use as the plates, i.e., substrates, in AMLCDs and certain other FPDs.

In AMLCDs, each pixel has its own switching element for regulating charges in the liquid crystal cell. Thin-film transistors (TFTs) are typically used as the switching element. The TFT, which is fabricated on the substrate, i.e., typically glass in prior art AMLCDs, consists of a gate electrode, a gate dielectric and a semiconductor layer with two electrodes for a source and a drain. The primary route to thin film transistor (TFT) based AMLCD technology is amorphous-silicon ($\alpha$-Si). Properties of the gate dielectric and $\alpha$-Si are degraded if such materials are deposited much below 250° C. Other FPD applications, such as electroluminescent (EL) displays and plasma display panels (PDPs) require even higher temperature processing steps.

Conventional plastics can typically withstand processing temperatures of up to only about 150° C. High temperature plastics are available, but these plastics are typically not suitably transparent for display applications. Such high temperature plastics are also typically birefringent. Birefringent materials have different refractive indices (optical density) in different co-ordinate directions. Images presented on a display formed from a birefringent material may appear to be somewhat skewed or otherwise imperfect when observed from various viewing perspectives. Thus, displays should preferably exhibit no more than a minimal amount of birefringence. Furthermore, due to the high coefficients of thermal expansion, the dimensional stability of most plastics with repeated temperature cycling is such that it would be difficult to achieve suitable registration and overlay accuracy for TFTs with multiple mask levels as used in AMLCDs. Thus, while conventional plastics can be used as the substrate for some FPD applications utilizing lower processing temperatures, e.g., passive LCDs, they can not be used for FPDs requiring high temperature processing.

It would be desirable, therefore, to replace the glass substrates used in such FPDs with a substrate that is transparent, not birefringent, possesses the low weight, robustness and low cost of plastics and has a high temperature stability not normally associated with such plastics.

SUMMARY OF THE INVENTION

Improved flat-panel displays, substrates therefor, and methods for forming same are disclosed. The compositions and methods of the present invention are based on hybrid inorganic-organic composites (IOCs) having application-specific properties.

In the hybrid IOCs, an organic polymer, i.e., plastic, is coupled with some fraction of an inorganic component to impart some of the inorganic's characteristic properties to the polymer. A substrate formed in this manner retains the desirable characteristics typically associated with plastic such as low weight and impact resistance, yet benefits from the additional characteristics imparted from the inorganic component, such as, for example, improved thermal properties. The hybrid IOCs can be tailored to possess specific properties as required for a particular application via manipulation of various parameters.

According to one embodiment of the invention, inorganic particles are grown in-situ from a precursor solution, combined with a coupling agent to ensure inorganic-organic compatibility in the solid state and then combined with an organic monomer. The hybrid IOC is formed by polymerizing the monomer. Such polymerization forms a matrix that surrounds the solvated inorganic particles. The hybrid IOC is formed from mixtures containing about 1–70 percent by weight, on a dry basis, of inorganic precursor, typically a metal alkoxide wherein the metal is selected from Si, Ti, Zr, Ge or Sn, about 20 to 98 percent by weight of the organic component, typically an acrylate-, epoxide- or styrene based monomer and about 1–70 percent by weight of the coupling agent.

Improved flat-panel displays are formed using the hybrid IOCs. In one embodiment of a process according to the present invention, a hybrid IOC useful as a substrate for an AMLCD is formed. Silica particles are generated in-situ from sodium metasilicate solution, combined with methacryloxy-propylmethyl dimethoxysilane, a difunctional silane coupling agent, and then combined with a hydroxyethyl methacrylate, a hydroxy-terminated organic monomer. The monomer is then polymerized. The resulting substrate is transparent, light weight, impact resistant and possesses thermal properties suitable for AMLCD processing. In other embodiments, improved AMLCDs, EL displays, PDPs and methods therefor are disclosed.

BRIEF DESCRIPTION OF THE DRAWINGS

Further features of the invention will become more apparent from the following detailed description of specific embodiments thereof when read in conjunction with the accompanying drawings in which:

FIG. 1 is a flow diagram of a method according to the present invention for making substrates formed from hybrid IOCs;

FIG. 5a is a simplified schematic of a flat-panel display according to the present invention;

FIG. 5b is a flow diagram of a process for making the flat-panel display of FIG. 5a;

DETAILED DESCRIPTION OF THE INVENTION

Figure 2:
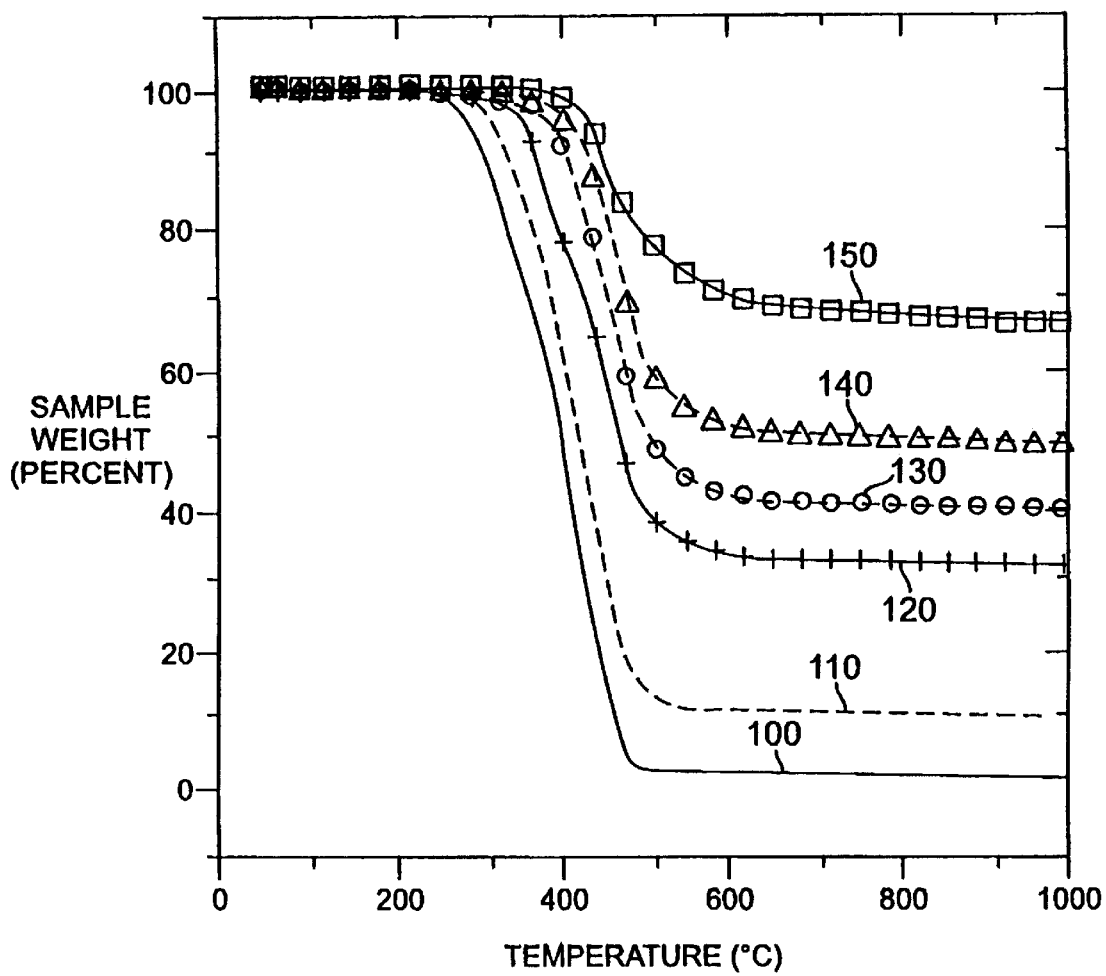
FIG. 2 shows thermogravimetric analysis data obtained on samples of hybrid IOC.

The hybrid IOCs utilized in the present invention contain an inorganic component in a matrix formed from an organic component. Such composites possess properties of both the inorganic component and the organic component and may be tailored for specific end use applications.

A method for making hybrid IOC substrates useful for AMLCDs and other flat-panel display applications according to the present invention is illustrated in FIG. 1. In operation block 10, a solution is provided of a precursor suitable for forming the inorganic component. The precursor solution is selected based on the properties to be imparted to the plastic. Preferably, the precursor is a metal alkoxide. Metal alkoxide can be represented by the formula $M(OR)_4$:

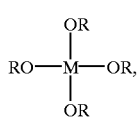

[1]

where: R is a polymerizable or non-polymerizable organic group, which can be individually selected, and M is a metal, preferably germanium (Ge), titanium (Ti), zirconium (Zr) or tin (Sn) and more preferably silicon (Si). Several non-limiting examples of such metal alkoxides include tetraethyl orthosilicate (TEOS), tetramethyl orthosilicate (TMOS), zirconium (IV) butoxide and zirconium (IV) propoxide.

The metal alkoxide can be purchased from a manufacturer, such as Gelest, Inc., of Tullytown, Pa. Alternatively, the metal alkoxide can be synthesized according to well known methods.

In further embodiments, modified metal alkoxides can be used as a precursor. In one such modified metal alkoxide, one or more of the —OR groups of the metal alkoxide is replaced by an —R group. Methyltriethoxysilane (MTEOS) is an example of such a modified alkoxide. See Brinker et al., *Sol-Gel Science: The Physics and Chemistry of Sol-Gel Processing*, p. 115, (Academic Press, CA 1990). This publication, and all other publications mentioned in this specification, are incorporated by reference herein. In an additional embodiment, one or more of the —OR groups of the metal alkoxide is replaced with a halogen, preferably chlorine. It is within the capabilities of those skilled in the art to select metal alkoxides and modified metal alkoxides suitable for forming inorganic particles.

Exemplary feed compositions for forming the hybrid IOC substrates contain about 1 to about 70 percent by weight, on a dry basis, of the inorganic precursor molecule.

In operation block 20, a metal-oxide based inorganic component is generated in-situ from the precursor solution via controlled nucleation and growth methods. Formation of the inorganic component occurs via two steps, which occur simultaneously after initialization. The first step is monomer formation via the partial hydrolysis of the metal alkoxide:

$$M(OR)_n + H_2O \rightarrow (RO)_{n-1}MOH + ROH \qquad [2]$$

Solvent and catalyst can be used to promote the reaction. The second step is polycondensation of the monomers to form colloid-like oligomers:

$$2(RO)_{n-1}MOH \rightarrow (RO)_{n-1}\text{-O-M}(OR)_{n-2}OH + ROH \qquad [3]$$

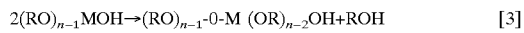
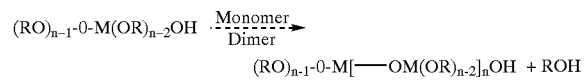

Thus, the inorganic component "grows" via a controlled polymerization. The terms "inorganic component" and "particle" are used interchangeably in this specification. The term "particle" refers to regions of relatively uniform density that are rich in the inorganic component. The polymerization can be controlled to yield particles having a specific molecular weight, i.e., size. The particles forming the colloid are nanometer (nm)-sized, i.e., less than a micron in diameter, and are preferably less than 400 nm in diameter. The formation of such nanometer-sized in-situ-generated inorganic particles is well known in the art. See, for example, Yoshida, A., "Silica Nucleation, Polymerization and Growth Preparation of Mono-Disperse Sols," in *The Colloidal Chemistry of Silica*, Bergna H. E., ed., Adv. Chem. Ser. 234, ACS, Wash. D.C. (1990); Gelest Catalog for Silicon, Germanium, Tin and Lead Compounds, Metal Alkoxides, Diketonates and Carboxylates, pp. 279–283 (1995). Those skilled in the art will recognize that the chemistry described above applies well known sol-gel techniques.

While dry inorganic particles could be conventionally blended into the polymeric host, it is preferable to generate them in-situ as per step 20. The reason for this is that during conventional blending, i.e., melt blending, particle agglomeration typically results. Such agglomeration may lead to light scattering and poor mechanical properties if the size-scale heterogeneity is sufficiently high. Alternatively, if a suspension of nanometer-sized inorganic particles can be obtained, such a suspension can be used rather than generating the particles in-situ in step 20.

Most multi-component systems suffer failure at the point of component interface. Thus, it is desirable to increase inter-component adhesion in some manner. One way to do this is by the addition of a coupling agent, as indicated in operation block 30. The coupling agent assists in establishing an "interphase region.". Such an architecture should enhance the mechanical properties of the hybrid IOC by facilitating inter-component stress transfer. Agglomeration and phase separation of the inorganic phase, which may lead to light scattering and birefringence, also should be minimized by using a coupling agent. Furthermore, it has been observed that the coupling agent can result in enhanced thermal resistance.

It is believed that the coupling agent chemically reacts with both the organic and inorganic components. As such, the coupling agent should have both inorganic and organic functional groups that behave chemically similar to the functional groups present in the organic component and the inorganic component. The choice of a coupling agent thus depends on the inorganic and organic components used.

For example, if the organic component is a methacrylate monomer and the inorganic component is tetramethyl orthosilicate or tetraethyl orthosilicate, a suitable coupling agent will contain a vinyl group to react with the vinyl group in the acrylate monomer and a Si—O—R group to react with the silanol groups, e.g., Si—O—H, that result from hydrolysis of the tetramethyl or tetraethyl orthosilicate. R can be any polymerizable or non-polymerizable organic compound, such as, without limitation, a methyl or an ethyl group. Preferably, the coupling agent has at least two M—O—R groups, i.e., two Si—O—R groups for the above example. Given the above organic and inorganic components, suitable coupling agents include, without limitation, methacryloxymethyltriethoxysilane ($C_{11}H_{22}O_5Si$), methacryloxymethyltrimethoxysilane ($C_8H_{16}O_5Si$), methacryloxypropylmethyldiethoxysilane ($C_{12}H_{24}O_4Si$), methacryloxypropylmethyldimethoxysilane ($C_{10}H_{20}O_4Si$), methacryloxypropyltriethoxysilane ($C_{13}H_{26}O_5Si$), methacryloxypropyltrimethoxysilane ($C_{10}H_{20}O_5Si$) and the like. If an epoxide monomer is used, then the coupling agent should include an epoxy group.

It will be appreciated by those skilled in the art that the R group of the inorganic functional group of the coupling agent will affect the rate and extent of the reaction between the coupling agent and the inorganic component. Furthermore, it should be understood that if the inorganic compound contains a metal other than Si, then the coupling agent should contain the other metal instead of silicon. Coupling agents can be obtained from manufacturers such as Gelest, Inc. of Tullytown, Pa. See, for example, Gelest Catalog for Silicon, Germanium, Tin and Lead Compounds, Metal Alkoxides, Diketonates and Carboxylates, pp. 41–52 (1995).

The coupling agent can oligomerize and conditions are selected to minimize coupling agent oligomerization. Such conditions are known to those skilled in the art. See Keefer, K. D., in *Silicon-Based Polymer Science*, ACS Symp. Ser., v. 224 (1990).

Preferably, the coupling agent should be added to the inorganic component in an amount sufficient to bond to all surface M—O—H groups of the inorganic particles (theoretical requirement). Preferably, an excess of two to three times the theoretical requirement should be added. Excess coupling agent is discarded. It should be appreciated that the theoretical coupling agent requirement may vary with the inorganic selected and the amount of the inorganic used. While the theoretical coupling agent requirement can be estimated from an approximation of the surface M—O—H groups based on average particle size, coupling agent requirements are best determined by routine experimentation. A figure of about 0.3 has been found to be satisfactory for the molar ratio of (the coupling agent):(the metal in the organic precursor) for the system described in the Example later in this specification. It is expected, however, that lesser amounts of coupling agent may suitably be used.

It will be appreciated by those skilled in the art that the aforementioned coupling agents are metal alkoxides having a polymerizable —R group. As previously described, such metal alkoxides are suitable for forming the inorganic component. Hence, in a further embodiment of the present invention, the inorganic component is generated from a coupling agent. Again, the organic functional group of the coupling agent is selected based on the monomer. In such cases, the coupling agent serves as the inorganic precursor, so that the coupling agent may comprise up to about 70 percent by weight of feed for forming the hybrid IOC. In such a case, it is not necessary to include additional coupling agent to graft the inorganic component to the organic component since the organic functional group is already present in the inorganic component.

In step 40, the polymer, i.e., plastic host matrix, is formed and the resulting composite is formed into the desired size and shape for an FPD substrate. For this purpose, a suitable monomer is added. When selecting a monomer for forming a hybrid IOC for use in FPDs, such a monomer should produce a plastic that is non-crystalline so that it is suitably transparent for a display and not birefringent. Those skilled in the art are familiar with the required optical properties. Furthermore, the monomer should produce a plastic having a high glass transition temperature, i.e., over 100° C. Those skilled in the art will be able to obtain the glass transition temperature for such polymers from reference materials. See, for example, Brandup & Immergut, "Polymer Handbook," (John Wiley & Son, 3rd ed., 1989).

Generally, it is desirable to add a minimum amount of the inorganic component that is required to impart the desired property. As increasing amounts of the inorganic component are added, the mass per unit volume of the hybrid IOC increases. Thus, it is preferable to select a monomer that is known to produce a plastic possessing a greater measure of the desired property than one producing a plastic possessing a lesser measure of the property. Without limitation, acrylate, epoxide and styrene monomer are suitable for forming the hybrid IOC substrates of the present invention. It is within the capabilities of those skilled in the art to select other monomers suitable for the present purpose. Once a monomer is selected, a parametric study is preferably undertaken wherein various hybrid IOCs are formed using the selected monomer and various levels of a selected inorganic component. The thermogravimetric properties and the coefficient of thermal expansion for the various samples are measured. A hybrid IOC is then suitably selected based on its thermal properties in view of the particular type of FPD being formed. Processing temperature requirements for various types of FPDs, known to those skilled in the art, are discussed later in this specification.

It is known that a serious drawback of the sol-gel methodology is drying shrinkage. Drying shrinkage occurs as cosolvents and reaction byproducts are removed from the sol-gel solution. Shrinkage causes cracks in the material. Such shrinkage can be avoided if all the initial components and byproducts can be incorporated directly into the resulting polymer. Thus, in a preferred embodiment, a means for reducing drying shrinkage is added. Such means can be a polymerizable solvent. Preferably, the polymerizable solvent is the monomer itself. Hydroxy-terminated monomers can be suitable for this purpose. See, Novak et al., "Simultaneous Interpenetrating Networks of Inorganic Glasses and Organic Polymers: New Routes into Nonshrinking Sol-Gel Derived Composites," Polym. Prep., v.31, pp. 698–99 (1990); Ellsworth et al., "Mutually Interpenetrating Inorganic-Organic Network: New Routes into Nonshrinking Sol-Gel Composite Materials," J. Am. Chem. Soc., v. 113, pp. 2756–58 (1991).

In a preferred embodiment, the polymerization reaction is initiated by a free-radical initiator. In a further preferred embodiment, a cross linker is added as well. The free-radical initiator and the cross linker are selected based on the monomer being used. Such selection is within the capabilities of those skilled in the art. Free-radical initiator and cross linker requirements based on monomer feed ranges about 1 to 5 weight percent.

If, as described above, a cross linker is added, then the reaction and molding steps should be performed simultaneously, such as by reaction injection molding (RIM). If a cross linker is not added, then the molding step may be performed after the hybrid IOC is formed using other injection molding techniques. Injection molding techniques such as RIM are well known to those skilled in the art.

Structural diversity of the IOCs is achieved through control of the relative ratio of the organic to the inorganic content, the level of structural complexity of the organic component and its chemical nature, the chemical composition of the inorganic precursor molecule, and reaction conditions used to synthesize the composite. Different morphologies are achieved via manipulation of various synthetic parameters and reaction conditions. In this manner, composite materials and their properties may be tailored for specific applications. It will be appreciated that the optimum organic and inorganic constituents, parameters and conditions for a particular application are best determined by routine experimentation, i.e., by varying the above-referenced parameters.

In the following Example, the foregoing methods are applied to form a hybrid IOC suitable for use in an AMLCD. It should be understood that the Example is provided by way of illustration, not limitation. Other inorganic and organic components can be used to form a hybrid IOC substrate suitable for use in AMLCDs or other FPDs. Improved FPDs, such as AMLCDs, plasma display panels (PDPs) and electroluminescent displays (EL), incorporating hybrid IOC substrates according to the present invention, will be described following the Example.

EXAMPLE

A hybrid IOC suitable for forming a AMLCD was formed from silica as the inorganic component and hydroxyethyl methacrylate as the organic component as follows. Rather than starting with a metal alkoxide, e.g., TEOS or the like, the inorganic component was generated from sodium metasilicate, an inexpensive, commercially available precursor, commonly known as "water-glass". The inorganic component was formed as follows. 17 grams of sodium metasilicate was dissolved at ambient temperature (about 25° C.) in 0.1 liters of de-ionized water. A solution of 3.0M HCl was prepared and 0.1 liters of such solution was transferred to a 500 cm$^3$ 3-neck flask and permitted to equilibrate at 0° C. in an ice-bath. Purified nitrogen was bubbled through the HCl solution for approximately 10 minutes. The sodium metasilicate solution was then added dropwise to the HCl solution with continuous mixing. After complete addition of the sodium metasilicate solution, the resulting solution was left to stir for three hours. The flask was then removed from the ice-bath, 60.0 g. of NaCl, 0.02 liters of NaOH and 0.160 liters of tetrahydrofuran (THF) were added and the system was stirred vigorously for one hour. The resulting suspension was filtered, the filtrate collected and transferred to a 0.5 liter separatory funnel. The aqueous layer was separated and discarded while the organic layer containing synthesized colloidal silica was collected. Purified nitrogen was bubbled through the solution.

The molecular weight of the poly(silicic acid) obtained was controlled by the reaction time and temperature. Experimental conditions to obtain specific molecular weights are known to those skilled in the art. See Abe et al., "Preparation of Polysiloxanes from Silicic Acid III: Preparation and Properties of Polysilicic Acid Butyl Esters," J. Polymer Sci., v. 21, no. 41 (1983); Ellsworth et al., "Inverse Organic-Inorganic Composite Materials 3: High Glass Content Non-Shrinking Sol-Gel Composites via Poly(silicic) acid esters," Chem. Mater., vol. 5, p. 839 (1993).

The formation of inorganic nanometer-size particles from sodium metasilicate is well known in the art. See Yoshida, A., "Silica Nucleation, Polymerization and Growth Preparation of Mono-Disperse Sols, in *The Colloidal Chemistry of Silica*, Bergna, H. E., ed., Adv. Chem. Ser. 234, ACS, Wash. D.C. (1990).

As discussed in more detail below, a methacrylate monomer was selected for organic compound formation. In view of this selection, methacryloxypropylmethyldimethoxysilane was selected as a coupling agent. As previously described, it is believed that the vinyl functional group in the coupling agent reacts with the vinyl functional group in the methacrylate monomer. 0.01 liters of coupling agent and 0.01 liters of 3.0O HCl were added to the colloidal silica solution. The system was stirred continuously for two hours at 25° C. These conditions were selected to minimize oligomerization of the coupling agent. Next, 50.0 g. of NaCl and 0.1 liter of de-ionized water were added. The resulting solution was stirred for an hour and then filtered. The filtrate was transferred to a separatory funnel and the organic portion was recovered. 30.0 g. of anhydrous sodium sulfate was added, stirred for four hours and then removed via filtration.

Hydroxyethyl methacrylate monomer was then added to the organic portion. This monomer was selected because it was expected to produce a transparent and non-birefringent plastic, but without reference to its thermal properties. Others monomers capable of producing a transparent plastic and having a higher glass transition temperature than hydroxyethyl methacrylate monomer can be used in preference to hydroxyethyl methacrylate monomer for forming a substrate suitable for a AMLCD. The hydroxy-terminated form of the monomer was selected to minimize drying shrinkage.

To obtain a hybrid IOC comprising about 50 percent by weight silica, 8.36 g. of monomer was added. Purified oxygen was bubbled through the solution to promote free-radical inhibition. The system was next heated via immersion in a water bath that was maintained at 80° C. Heating continued until approximately 0.01 liters of liquid was distilled off and collected via a Dean Stark trap. The residue was recovered and 0.17 g. each, e.g., 2 weight percent based on the monomer, of a free radical inhibitor (benzoyl peroxide), and a trifunctional acrylate cross linker (2-ethyl-2-[hydroxymethyl]-1,3-propandiol triacrylate) were added, and residual THF was removed via rotary-evaporator. The resulting solution was poured into molds formed from foil lined petri-dishes. Polymerization was carried out under nitrogen in a vacuum oven at 60° C. for six hours, then at 120° C. for 12 more hours.

Composites were generated over the range of 0 to 65 percent by weight silica. Cured samples were teansparent and appeared clear to the eye. Process conditions for colloidal synthesis and coupling agent graft were fixed to maintain consistent morphology and molecular weight of the inorganic phase. Material composition was varied by varying the amount of monomer; the inorganic component amount remained fixed.

Figure 3:
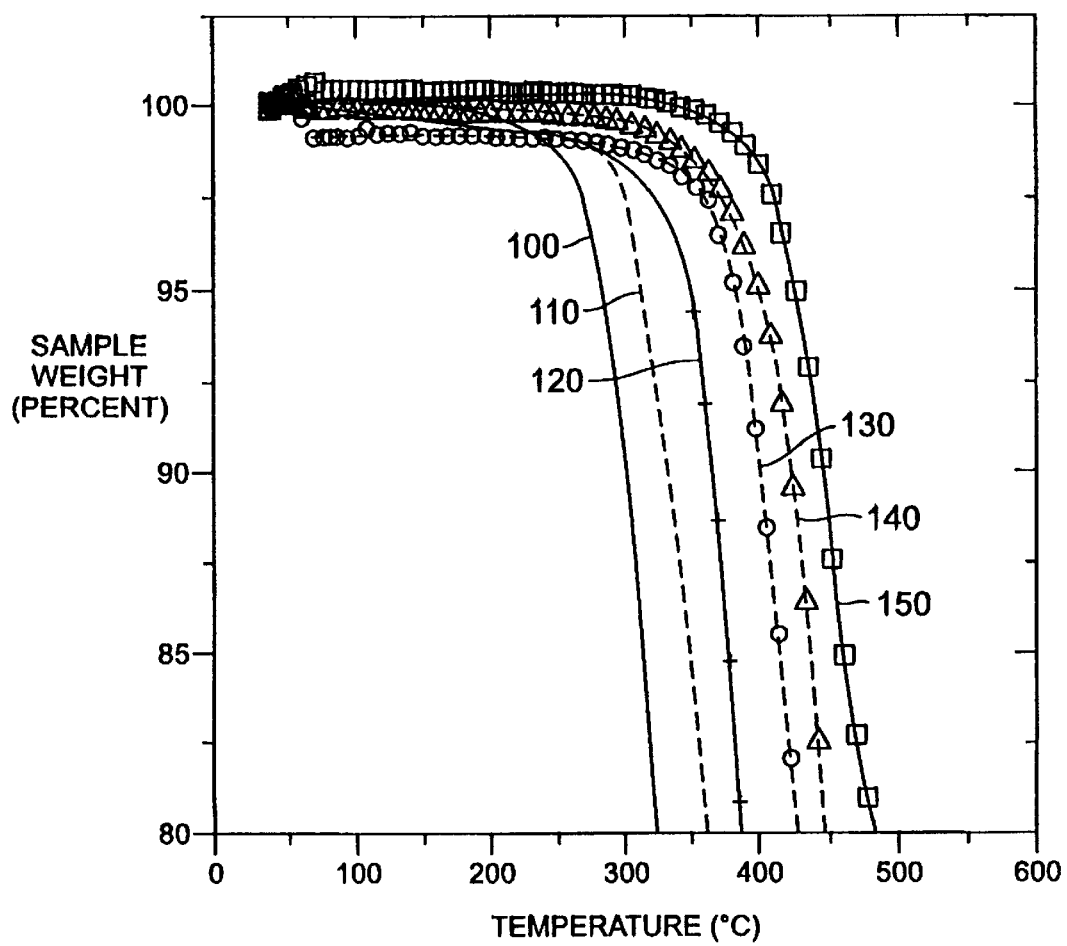
FIG. 3 is an expansion of the TGA data shown in FIG. 2.
Figure 4:
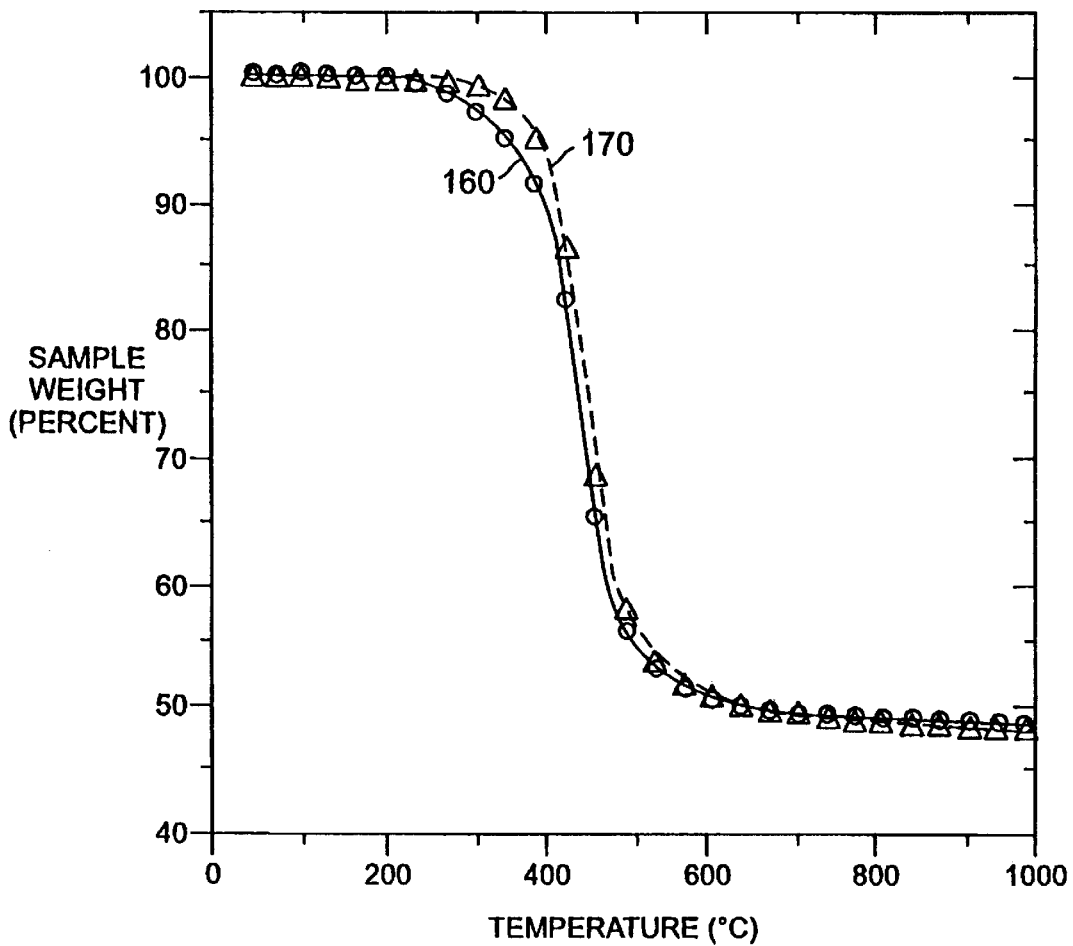
FIG. 4 illustrates the effect of the coupling agent on thermal properties.

The thermogravimetric analysis (TGA) data presented in FIGS. 2–4 was obtained under a nitrogen atmosphere utilizing a Polymer Labs™ STA-1000. Data was collected on 8–12 mg samples over a temperature range of 25 to 1000° C. at a heating rate of 10° C. per minute. The decomposition-onset temperatures indicated were extrapolated from the experimental data via RheometricScientific™ thermal analysis software.

FIG. 2 illustrates the relationship between hybrid IOC silica content and thermal decomposition temperature. Each curve is associated with a different silica content as follows:

| Reference Numeral | Nominal Silica Content, wt % |
|---|---|
| 100 | 0 |
| 110 | 10 |
| 120 | 30 |
| 130 | 40 |
| 140 | 50 |
| 150 | 65 |

As illustrated in FIG. 2, as silica content increases, so does the thermal decomposition temperature. FIG. 3 is an expansion of the data shown in FIG. 2, with a focus on the region of the curves exhibiting onset of thermal decomposition. The onset of thermal decomposition is identified by a precipitous drop in sample weight. FIG. 3 shows the decomposition onset temperature increasing incrementally from 277° C. for the curve 100, the unadulterated polymer, to 417° C. for curve 150, the composite containing 65 weight percent silica. It will be appreciated that the manipulation of other parameters, such as particle morphology and size, can affect other properties of the hybrid IOC. For example, if the inorganic particles are too large, they will scatter light, reducing the transparency of the hybrid IOC.

As shown in FIG. 4, the coupling agent can affect the thermal properties of the hybrid IOC. Curve 160 shows TGA data at 50 weight percent silica without coupling agent and curve 170 shows TGA data at 50 weight percent silica with coupling agent. The decomposition-onset temperature of the hybrid IOC is increased by incorporating a small quantity of coupling agent.

Having described how to make composite substrates suitable for use in flat-panel displays, methods for making AMLCDs and other types of FPDs using such substrates will be described below. Since the composites are engineered to withstand FPD processing temperatures, standard procedures for forming the FPD can be used. See O'Mara, W. C., "Liquid Crystal Flat Panel Displays: Manufacturing Science & Technology," (Van Nostrand Reinhold, 1993). The difference between the prior art FPDs and those of the present invention is that according to the present invention, hybrid IOC substrates replace glass substrates typically used.

A flat panel display according to the present invention is illustrated in FIG. 5a. A method for forming such an FPD is shown in FIG. 5b. As shown in FIG. 5a, the FPD comprises at least one hybrid IOC-based substrate 55, a plurality of device layers 75 and drive circuitry 85. The device layers include interconnect lines for delivering a signal to the appropriate pixel, color filters or light generating phosphors, insulating and supporting layers or structures and the like depending upon the display type. FPDs according to the present invention can comprise two substrates, each having different functional layers associated therewith, that are joined. Alternatively, FPDs according to the present invention can comprise a single substrate having a number of device layers deposited thereon. The implementation of the drive circuitry 85 is well known to those skilled in the art.

Thus, in operation block 60 of the method of FIG. 5b, a hybrid IOC substrate is formed according to the previously-described methods for use in a FPD. It should be appreciated that the hybrid IOC substrate must have properties, i.e., thermal, chemical resistance and the like, appropriate for the particular FPD application, as described in more detail below. As indicated in operation block 70, the plurality of device layers or structures 75 are formed. It will be appreciated that the specific processing occurring within operation block 70 will vary with the type of display being formed. The details of such processing for several types of FPDs are described below. Finally, in operation block 80, the device layers 75 are electrically connected to drive circuitry 85.

Figure 6:
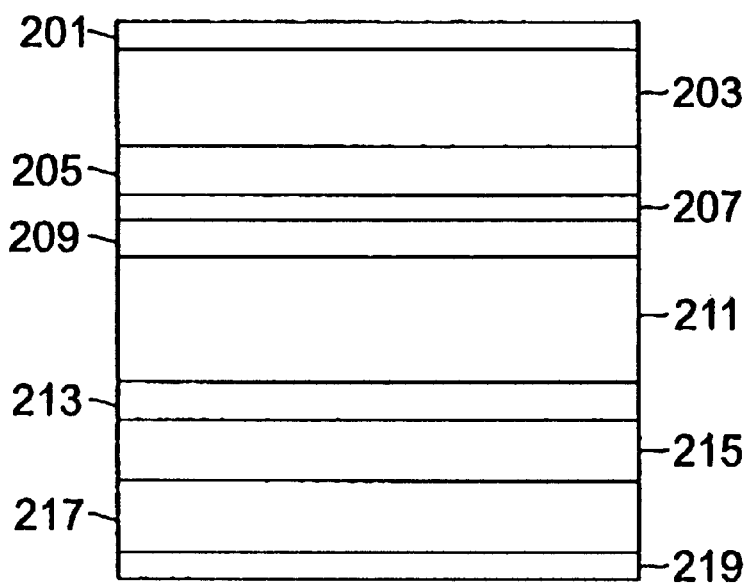
FIG. 6 is a simplified schematic of an AMLCD shown according to the present invention shown in cross section.

A simplified schematic of an AMLCD according to the present invention is shown in cross section in FIG. 6. The arrangement and function of the various elements of the AMLCD are well known in the art and will not be described in detail. Various layers of materials are deposited on each of two substrates, 203 and 217, as described in more detail below. The substrates are then joined, leaving a separation between the substrates for liquid crystal material 211. AMLCD processing temperatures are in the range of about 300–470° C. for α-Si TFT-based displays.

The elements of the AMLCD associated with the substrate 203 comprise a polarizer 201, color filters 205, transparent electrode 207 and orientation film 209. The elements of the AMLCD associated with the substrate 217 comprise a polarizer 219, thin-film transistor and interconnect lines 215 and orientation film 213. In prior art AMLCDs, the substrates are glass. In AMLCDs according to the present invention, the substrates 203 and 217 are formed of a hybrid IOC capable of withstanding the above-noted processing temperatures. Acrylate-, epoxide- or styrene-based monomers may be suitably selected. A silane-based coupling agent having functional groups suitably selected according to monomer and inorganic component selection is preferably used. While the required amount of inorganic is best determined by routine experimentation, it is expected that suitable hybrid IOC compositions will contain at least 30 weight percent of the inorganic component. AMLCDs also include drive circuitry and a light source, not shown.

Figure 7:
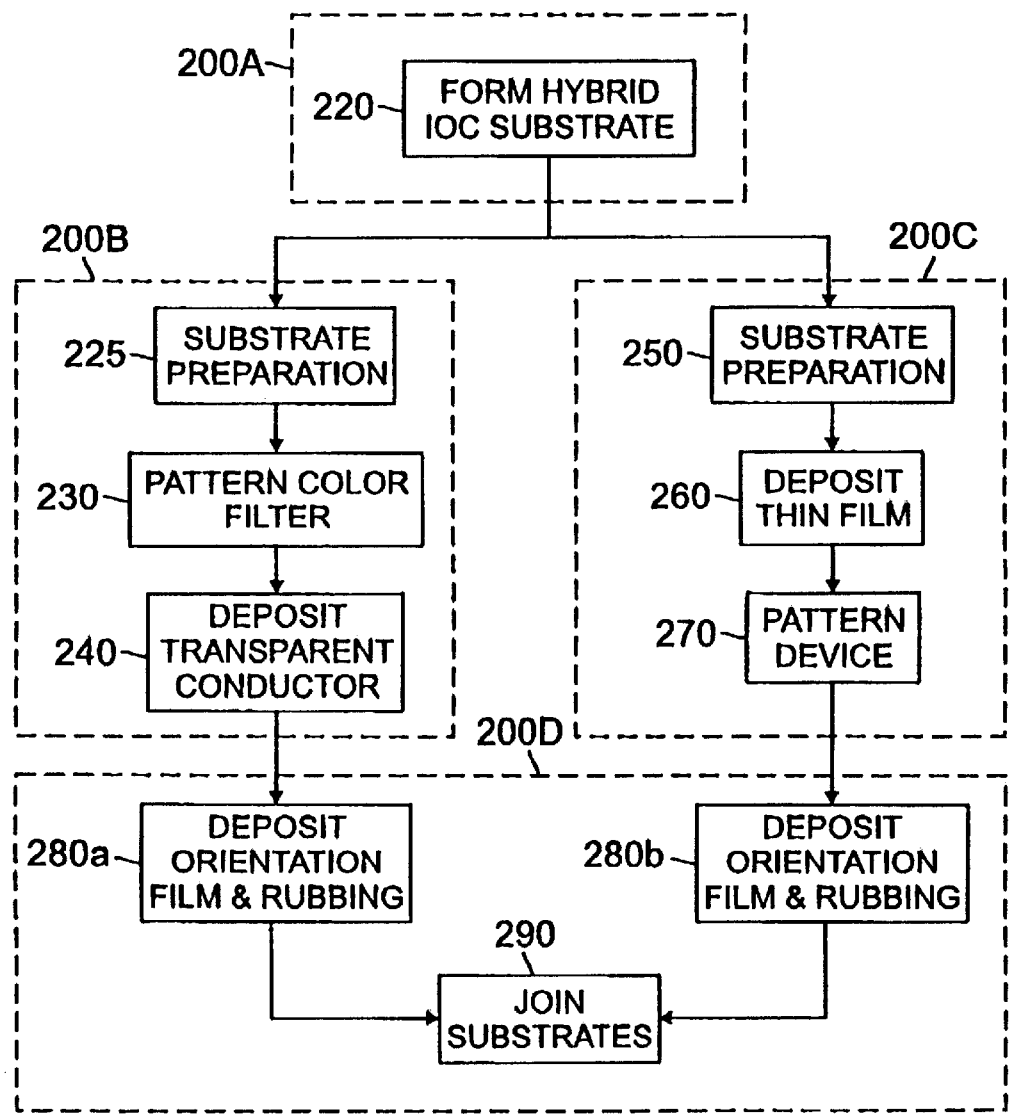
FIG. 7 is a flow diagram of a process for making an AMLCD according to the present invention.

In a method according to the present invention, an AMLCD is formed in four operations, as shown in FIG. 7. In the first operation, 200A, a hybrid IOC substrate is formed, as indicated in step 220 and as described above.

The other three operations, identified by operation blocks 200B–200D, pertain to the processing required to form the various functional layers and structures associated with each substrate and joining the substrates to form the AMLCD. In operation block 200B, the color filter elements 205 and associated layers are formed on a first substrate, such as the substrate 203, as indicated in steps 225–240. In operation block 200C, thin film transistors and interconnect lines 215 are formed on a second substrate, such as the substrate 217, as indicated in steps 250–270. Finally, in operation 200D, the two substrates are assembled and liquid crystal material 211 is injected between them. These operation blocks thus describe the processing, for an AMLCD, that is indicated generically in operation block 70 of FIG. 5b. The method of FIG. 7 will now be described in more detail.

In prior art AMLCDs, a significant amount of pretreatment is required to prepare the glass substrates for color filter and TFT manufacturing. It is expected that the extent of such pretreatment will be reduced when using hybrid IOC-based substrates. Pretreatment is indicated in steps 225 and 250.

After pretreatment, the color filter elements 205 are formed as indicated in step 230. Methods for forming the color filters 205 and TFTs and interconnect lines 215 are well known and will not be described in detail. Briefly, the color filter formation process entails, forming three primary color elements, red, blue and green, each one about 100×300 microns in size. A black border area is required around each color element for contrast. Dyestuffs or pigments can be used as the light-absorbing color filter elements. They can be deposited and patterned in several ways known to those skilled in the art. After color filter definition, an over coating to planarize the color filter array is added.

A transparent electrode material 207, typically indium-tin oxide (ITO), is deposited over the color filters, as indicated in step 240. The electrode material is ordinarily not patterned when TFTs are used to switch the color elements.

The TFTs are formed on the second substrate 217 in operation 200C. First, the substrate 217 is prepared by appropriate cleaning, as noted in step 250. After preparing the substrate, a thin film is deposited on the substrate, and then patterned, as indicated in steps 260 and 270. A sequence of thin films is applied and patterned, the number and sequence of which is dependent on the transistor design being used.

In operation 200D, the substrate 203 having the color filter array 205 and the substrate 217 having the TFTs and interconnect lines 215 are assembled. For each substrate, a thin polymer film 209, 213 is deposited for orientation of the liquid crystal molecules at the substrate surface, as indicated in steps 280a and 280b. After deposition and baking, the film is rubbed with a fabric in a chosen direction. Such rubbing leaves grooves in the surface of the film, which aid the liquid crystal molecules in aligning at the substrate surface, and also to adopt the proper tilt angle. After performing additional steps pertaining to sealing and the application of spacers, the substrates 203 and 217 are brought together and sealed, as indicated in step 290. Liquid crystal material 211 is then injected between the substrates through a hole left in the seal material.

As previously noted, the present methods are applicable to other types of FPDs. It should be understood, however, that to the extent other FPDs require processing temperatures exceeding about 500° C., the hybrid IOC substrates will be predominantly inorganic, i.e., greater than 50 percent inorganic component, to provide the requisite thermal properties. In further embodiments of the present invention, an improved electroluminescence display and methods for making such a display are disclosed. Electroluminescence is a phenomenon that converts electrical energy to luminous energy without generating heat. Thin-film electroluminescent (TFEL) displays are characterized by a wide viewing angle, high contrast, wide operating temperature range, ruggedness and long life.

Figure 8:
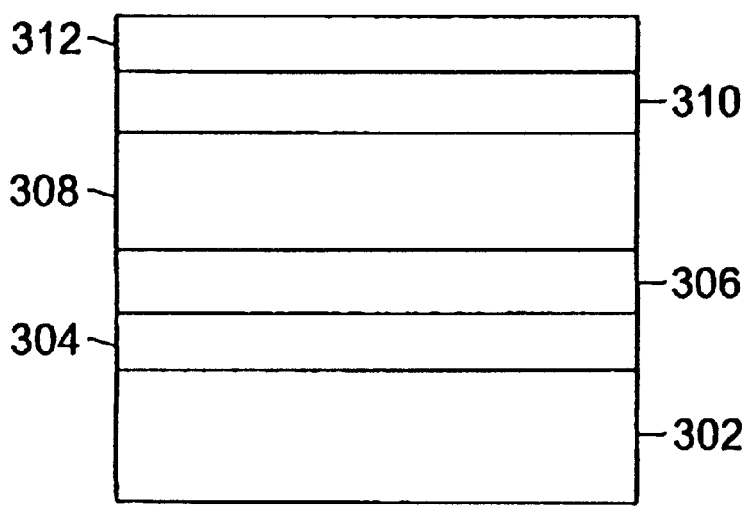
FIG. 8 is a simplified schematic of an EL display according to the present invention shown in cross section.
Figure 9:
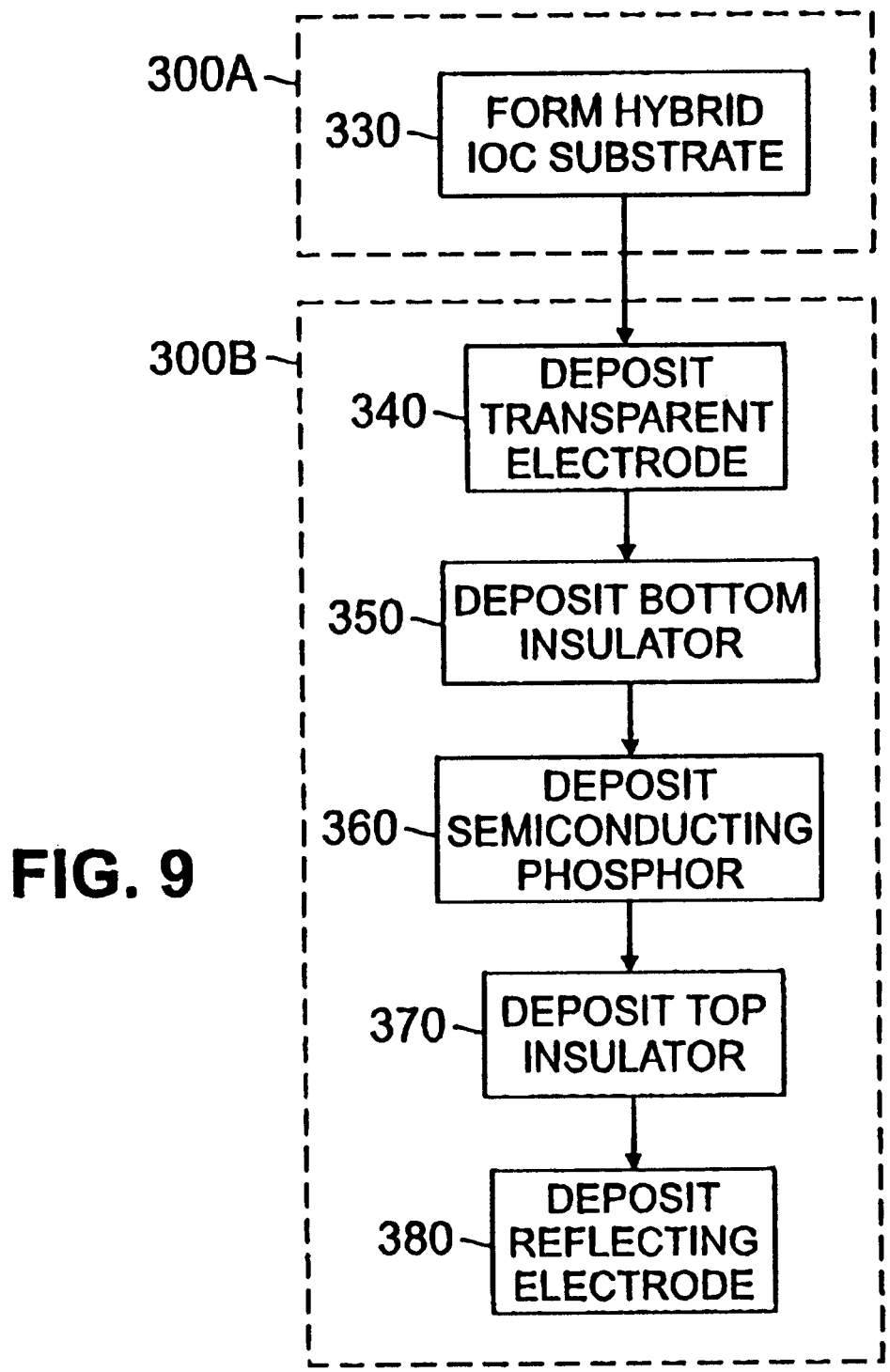
FIG. 9 is a flow diagram of a process for making an EL display according to the present invention.

A simplified schematic of an alternating-current driven TFEL (ACTFEL) display according to the present invention is shown in cross section in FIG. 8. The ACTFEL display is configured as a metal-insulator-semiconductor-insulator-metal (MISIM) thin film. A method according to the present invention for forming an ACTFEL display is illustrated in FIG. 9. Note that substrate pretreatment steps, i.e., cleaning and the like, are not shown but they are part of the manufacturing process. The specific functions and materials properties of the various layers shown in FIG. 8 are known to those skilled in the art and will not be described in detail. See, for example, Rack et al., "Materials Used in Electroluminescent Displays," Mat. Res. Soc'y. Bull., v. 21(3), pp. 49–58, Mar. 1996.

An ACTFEL display according to the present invention comprises a hybrid IOC substrate 302. The substrate must be able to withstand processing temperatures of about 550° C. Suitable substrates include acrylate-, epoxide and styrene-based monomers having aromatic sidechains and relatively high amounts of the inorganic component, e.g., greater than about 50 percent. The substrate is formed according to the methods described above as indicated in step 330 in operation block 300A. Device layers are formed in operation block 300B. The steps in operation block 300B are descriptive of the processing, for an ACTFEL, that is referenced generically in operation block 70 of FIG. 5b.

A layer of transparent electrode material 304 is deposited on the substrate 302, as indicated in step 340. Typically ITO is used for the layer 304. A transparent bottom insulator 306 is then deposited on the transparent electrode material 304, as indicated in step 350. Preferred materials for the bottom insulator are those having a high dielectric constant and a high electric field strength, but not subject to "propagating breakdown," which results in catastrophic failure of the EL device. In practice, high dielectric-constant insulators often exhibit propagating breakdown. As a result, lower dielectric-constant insulators that exhibit "self-healing breakdown" wherein failures are localized are more practical for use in such devices.

Semiconducting phosphor material 308 is deposited on the bottom insulator 306, as indicated in step 360. The phosphor material includes two constituents, a host material and a luminescent center. The host material dominates the electrical aspects of the phosphor layer and the luminescent center controls the optical emission properties of the phosphor layer. Typical host materials are metal sulfides in which the metal is zinc (Zn), calcium (Ca) or strontium (Sr). The luminescent center is obtained by doping the host with manganese ($Mn^{+2}$), terbium (Tb), samarium (Sm), Europium (Eu), Thulium (Tm) and cerium (Ce). Different host-luminescent center combinations result in different color emissions.

A transparent top insulator 310 is deposited on the phosphor constituents 308, as indicated in step 370. Finally, a top layer 312 that functions as an electrode and optical reflector is deposited on the top insulator 310, as indicated in step 380.

In additional embodiments of the present invention, a plasma display and methods therefor are disclosed. Color plasma displays generate light by exciting a phosphor layer that emits visible light. Three different phosphors are used to generate the three primary colors. The phosphors are excited by ultraviolet light that is generated via a gas discharge within the plasma display panel (PDP). PDPs are particularly suitable for large-area displays.

Figure 10:
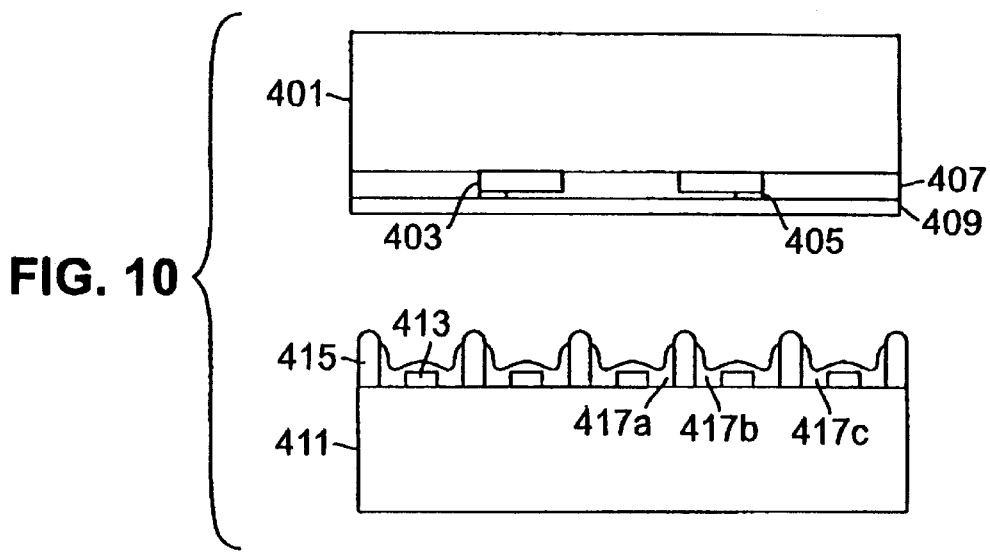
FIG. 10 is a simplified schematic of a PDP according to the present invention shown in cross section.
Figure 11:
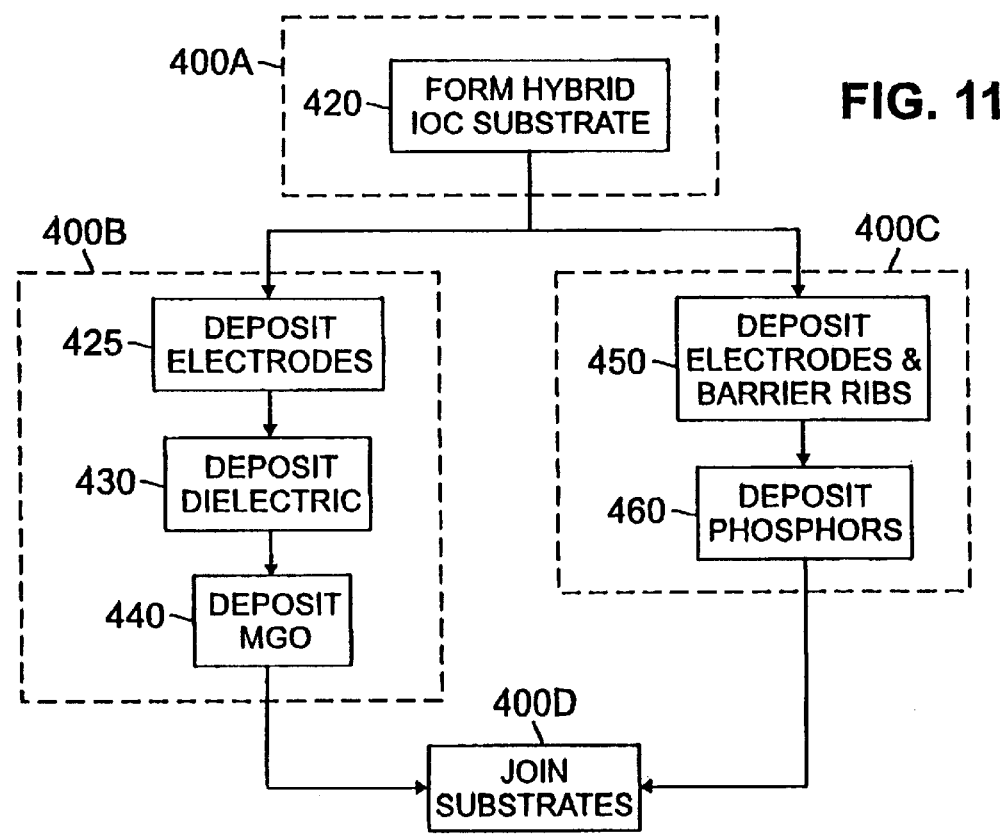
FIG. 11 is a flow diagram of a process for making a PDP according to the present invention.

A simplified schematic of a PDP according to the present invention is shown in cross section in FIG. 10. A process according to the invention for making the PDP of FIG. 10 is illustrated in FIG. 11. Like AMLCDs according to the present invention, PDPs are formed in four operations as described below. Substrate pretreatment steps, which are part of the manufacturing process, are not shown in the FIG. 11 flow diagram.

PDPs according to the present invention comprise two hybrid IOC substrates, 401 and 411. The substrates 401 and 411 are formed as indicated in operation block 400A of FIG. 11 and as described above. The substrates must be able to withstanding processing temperatures as high as 450–600° C. Suitable substrates include acrylate-, epoxide and styrene-based monomers having aromatic sidechains and relatively high amounts of the inorganic component, e.g., greater than about 50 percent. The substrates are then cleaned. The front substrate 401 is processed as indicated in operation block 400B. In step 425, thin-film electrodes 403 and 405 are formed using well-known photo lithographic techniques. Electrodes 403 are sustain electrodes and electrodes 405 are bus electrodes. As indicated in step 430, the electrodes 403 and 405 are covered with a thin layer of dielectric material 407 that acts like a capacitor. A thin layer of magnesium oxide (MgO) 409 is deposited on the dielectric material 407. The MgO layer 409 increases the life of the display and reduces drive voltage.

The back substrate 411 is processed as indicated in operation block 400C using well known thick-film screen-printing processing. Using a multiplicity of printing steps, address electrodes 413 and barrier-ribs 415 are formed as indicated in step 450. Phosphors, such as phosphor 417a for generating red light, 417b for generating green light and 417c for generating blue light, are deposited between the barrier-ribs 415. The barrier-ribs 415 separate the substrates 401 and 411 and maintain color purity by isolating the different phosphors, e.g., 417a, 417b and 417c.

As indicated in operation block 400D, the substrates 401 and 411 are joined and hermetically sealed. As joined, the electrodes 403, 405 of the front substrate 401 and the electrodes 413 of the back substrate 411 are oriented at right angles with respect to one another. For illustrative purposes, these electrodes were pictured in a parallel orientation in FIG. 10. It should be understood that in a PDP, either the front or back substrate and associated layers as pictured in FIG. 10 would be rotated by 90°. The space between the substrates 401 and 411 is filled with a mixture of neon and xenon gases. The steps performed in operation blocks 400B–400D are descriptive, for a PDP, of the processing referenced generically in step 70 of FIG. 5b.

Further details concerning the various elements of the PDP and the requirements for the substrates 401 and 411 are known to those skilled in the art. See, for example, Weber et al., "Materials and Manufacturing Issues for Color Plasma Displays," Mat. Res. Soc'y. Bull., v. 21(3), pp. 65–68, Mar. 1996.

It should be understood that the embodiments described herein are illustrative of the principles of this invention. Various modifications may occur to, and be implemented by, those skilled in the art in view of the present teachings without departing from the scope and the spirit of the invention.

I claim:

1. A flat-panel display, comprising:
    at least a first substrate, the first substrate formed from a hybrid inorganic-organic composite comprising:
        about 1 to 70 weight percent of an inorganic component and about 30 to 99 weight percent of an organic component in the form of a suitably transparent and suitably non-birefringent polymer matrix in which the inorganic component is dispersed, wherein, the inorganic and organic components are coupled and the inorganic component increases the thermal decomposition temperature and decreases the coefficient of thermal expansion of the coupled components compared to the organic component alone, and, wherein the hybrid inorganic organic composite is molded into a shape and size suitable for a flat panel display; and
    a plurality of device layers deposited on the first substrate for generating light of a desired color.

2. The flat-panel display of claim 1 wherein the display is an electroluminescent display, the display further comprising:
    a transparent electrode formed on the first substrate;
    a first transparent insulator formed on the transparent electrode;
    semiconducting phosphor deposited on the first transparent insulator;
    a second transparent insulator formed on the semiconducting phosphor; and
    a reflecting electrode formed on the second transparent insulator.

3. The flat-panel display of claim 1 further comprising:
    a second substrate separated from the first substrate by the device layers.

4. The flat-panel display of claim 3 wherein the display is an active matrix liquid crystal display, the display further comprising:
    a first plurality of layers comprising color filters formed on the first substrate and a transparent conductor formed on the color filters;
    a second plurality of layers comprising thin-film transistors formed on the second substrate; and
    liquid crystal material, wherein,
        the first substrate and first plurality of layers, and the second substrate and second plurality of layers are joined and wherein the liquid crystal material is between the first and the second substrate.

5. The flat-panel display of claim 4 further comprising display-drive circuitry electrically connected to one of the layers.

6. The flat panel display of claim 4, wherein said organic component is selected from the group consisting of acrylate-based monomers, epoxide-based monomers and styrene-based monomers.

7. The flat panel display of claim 4, wherein said first substrate comprises at least about 30 weight percent of said inorganic component.

8. The flat panel display of claim 4, wherein said first plurality of layers are disposed on a first side of said first substrate.

9. The flat panel display of claim 8, further comprising a first orientation film that is disposed on said first plurality of layers.

10. The flat panel display of claim 8, further comprising a first polarizer that is disposed on a second side of said first substrate.

11. The flat panel display of claim 8, wherein said second plurality of layers are disposed on a first side of said second substrate.

12. The flat panel display of claim 11, further comprising a second orientation film that is disposed on said second plurality of layers.

13. The flat panel display of claim 11, further comprising a second polarizer that is disposed on a second side of said second substrate.

14. The flat panel display of claim 11, wherein:

when said first substrate and first plurality of layers, and said second substrate and second plurality of layers are joined, said first side of said second substrate is proximal to said first side of said first substrate, and said second side of said second substrate is distal to said first side of said first substrate.

15. The flat-panel display of claim 3 wherein the display is a plasma display, the display further comprising:

a plurality of electrodes formed on the first substrate, a capacitive layer formed over the electrodes, and a layer suitable for reducing drive voltage formed over the capacitive layer; and, a plurality of spaced electrodes formed on the second substrate, barrier ribs formed on the second substrate in the space between the electrodes, and phosphors deposited on the electrodes and the second substrate, wherein, the first and second substrates and the layers formed thereon are joined, and, when joined, the electrodes formed on the first substrate are perpendicular to the electrodes formed on the second substrate.

\* \* \* \* \*